US008887206B2

(12) United States Patent
Block et al.

(10) Patent No.: US 8,887,206 B2
(45) Date of Patent: Nov. 11, 2014

(54) DEVICE AND METHOD FOR RENDERING AND DELIVERING 3-D CONTENT

(75) Inventors: Robert S. Block, Reno, NV (US); Thomas Forrester, Los Angeles, CA (US); Winston Hodge, Yorba Linda, CA (US); Sue Hodge, legal representative, Newport Beach, CA (US)

(73) Assignee: CSTEREO3D, LLC, Reno, NV (US)

( * ) Notice: Subject to any disclaimer, the term of this patent is extended or adjusted under 35 U.S.C. 154(b) by 0 days.

(21) Appl. No.: 13/493,467

(22) Filed: Jun. 11, 2012

(65) Prior Publication Data

US 2013/0117789 A1    May 9, 2013

Related U.S. Application Data

(60) Provisional application No. 61/495,140, filed on Jun. 9, 2011, provisional application No. 61/529,908, filed on Aug. 31, 2011.

(51) Int. Cl.
| | |
|---|---|
| *H04N 7/20* | (2006.01) |
| *H04N 7/173* | (2011.01) |
| *H04N 21/2343* | (2011.01) |
| *H04N 13/00* | (2006.01) |

(52) U.S. Cl.
CPC ..... *H04N 21/23439* (2013.01); *H04N 13/0059* (2013.01)
USPC .............................. 725/67; 725/109; 725/116

(58) Field of Classification Search
USPC ............................................ 725/67, 116, 109
See application file for complete search history.

(56) References Cited

U.S. PATENT DOCUMENTS

| | | | |
|---|---|---|---|
| 4,704,627 A | 11/1987 | Yuyama et al. | |
| 5,606,363 A | 2/1997 | Songer | |
| 6,614,927 B1 | 9/2003 | Tabata | |
| 2010/0074594 A1* | 3/2010 | Nakamura et al. | 386/92 |
| 2010/0091091 A1* | 4/2010 | Kim | 348/42 |
| 2010/0182404 A1* | 7/2010 | Kuno | 348/43 |
| 2011/0037837 A1* | 2/2011 | Chiba et al. | 348/53 |
| 2011/0038614 A1 | 2/2011 | Chen et al. | |

(Continued)

OTHER PUBLICATIONS

International Search Report (PCT/ISA/210) issued on Aug. 16, 2012, by the US Patent Office as the International Searching Authority for International Application No. PCT/US2012/041834.

(Continued)

*Primary Examiner* — Pankaj Kumar
*Assistant Examiner* — Franklin Andramuno
(74) *Attorney, Agent, or Firm* — Buchanan Ingersoll & Rooney PC

(57) ABSTRACT

A device and method are provided for delivering three-dimensional (3-D) content. The device includes a receiving unit configured to receive a first signal containing at least two-dimensional (2-D) content, a processing unit configured to (i) determine an amount of a difference in the content in the first signal to be visualized by a left visual sensor and a right visual sensor, (ii) determine whether the amount of the difference is less than or equal to a predetermined minimum value, and to discard the signal to be visualized by one of the right and left visual sensors when the amount is determined to be less than or equal to the predetermined minimum value, and (iii) generate a second signal containing the 2-D content of the first signal and 3-D content in which the first signal to be visualized by the one of the right and left visual sensors is discarded.

39 Claims, 6 Drawing Sheets

(56) References Cited

U.S. PATENT DOCUMENTS

| | | | |
|---|---|---|---|
| 2011/0090305 A1* | 4/2011 | Ikeda et al. | 348/42 |
| 2011/0249958 A1* | 10/2011 | Fujita et al. | 386/280 |
| 2011/0273534 A1* | 11/2011 | Luthra et al. | 348/43 |
| 2012/0008672 A1* | 1/2012 | Gaddy et al. | 375/240.01 |
| 2012/0033035 A1* | 2/2012 | Lee et al. | 348/42 |
| 2012/0113235 A1* | 5/2012 | Shintani | 348/51 |
| 2012/0162366 A1* | 6/2012 | Ninan et al. | 348/43 |
| 2012/0314028 A1* | 12/2012 | Bruls | 348/43 |

OTHER PUBLICATIONS

Written Opinion (PCT/ISA/237) issued on Aug. 16, 2012, by the US Patent Office as the International Searching Authority for International Application No. PCT/US2012/041834.

* cited by examiner

DEVICE AND METHOD FOR RENDERING AND DELIVERING 3-D CONTENT

RELATED APPLICATIONS

This application claims priority as a non-provisional application to U.S. Patent Application No. 61/495,140 filed on Jun. 9, 2011 and U.S. patent application No. 61/529,908 filed on Aug. 31, 2011, the entire contents of which are hereby incorporated by reference in their entirety.

FIELD

The present disclosure relates to a device and method for delivering three-dimensional (3-D) content.

BACKGROUND INFORMATION

Viewing 3-D content provides viewers with a more fulfilling experience as compared to viewing 2-D content. However, there are problems associated with 3-D media creation, enhancement, and transmission, such as bandwidth limitations and discomfort and/or disorientation problems (e.g., headaches), associated with the viewing of 3-D media, especially movies, delivered by conventional techniques.

There is a bandwidth consumption issue with conventional techniques due to the existence of signal differences between standard 2-D transmissions and 3-D transmissions. For instance, 2-D and 3-D signals for the same program are transmitted on different communication channels using conventional techniques. This effectively requires at least twice the amount of bandwidth for the same program. Furthermore, some people complain of headaches, discomfort, fatigue, disorientation and other related maladies when watching stereoscopic 3-D movies or playing 3-D games for more than a few minutes.

SUMMARY

An exemplary embodiment of the present disclosure provides a device for delivering three-dimensional (3-D) content. The exemplary device includes a receiving unit configured to receive a first signal containing at least two-dimensional (2-D) content. The exemplary device also includes a processing unit configured to (i) determine an amount of a difference in the content in the first signal to be visualized by a left visual sensor and a right visual sensor, (ii) determine whether the difference is less than or equal to a predetermined minimum value, (iii) discard a portion of the first signal to be visualized by one of the left visual sensor and the right visual sensor corresponding to the amount of the difference when the amount of the difference is determined to be less than or equal to the predetermined minimum value, and (iv) generate a second signal containing the 2-D content of the first signal and 3-D content in which the portion of the first signal to be visualized by the one of the left visual sensor and the right visual sensor is discarded.

An exemplary embodiment of the present disclosure provides a method for delivering three-dimensional (3-D) content. The exemplary method includes receiving a first signal containing at least two-dimensional (2-D) content, and determining, in a processing unit of a computerized device, an amount of a difference in the content in the first signal to be visualized by a left visual sensor and a right visual sensor. The exemplary method also includes determining, in the processing unit, whether the amount of the difference is less than or equal to a predetermined minimum value. In addition, the exemplary method includes discarding, in the processing unit, a portion of the first signal to be visualized by one of the left visual sensor and the right visual sensor corresponding to the amount of the difference when the amount of the difference is determined to be less than or equal to the predetermined minimum value. Furthermore, the exemplary method includes generating, in the processing unit, a second signal containing the 2-D content of the first signal and 3-D content in which the portion of the first signal to be visualized by the one of the left visual sensor and the right visual sensor is discarded.

An exemplary embodiment of the present disclosure provides a non-transitory computer-readable recording medium having a computer program recorded thereon that causes a processor of computing device to deliver three-dimensional (3-D) content. The program causes the processor to execute operations comprising: receiving a first signal containing at least two-dimensional (2-D) content; determining an amount of a difference in the content in the first signal to be visualized by a left visual sensor and a right visual sensor; determining whether the amount of the difference is less than or equal to a predetermined minimum value; discarding a portion of the first signal to be visualized by one of the left visual sensor and the right visual sensor corresponding to the amount of the difference when the amount of the difference is determined to be less than or equal to the predetermined minimum value; and generating a second signal containing the 2-D content of the first signal and 3-D content in which the portion of the first signal to be visualized by the one of the left visual sensor and the right visual sensor is discarded.

An exemplary embodiment of the present disclosure provides a method for enhancing three-dimensional (3-D) content. The exemplary method includes determining, in a processing unit of a computerized device, an amount of a difference in 3-D content to be visualized by a left visual sensor and a right visual sensor. The exemplary method includes determining, in the processing unit, whether the amount of the difference is less than or equal to a predetermined minimum value. The exemplary method also includes automatically outputting a notification of an anomaly in the 3-D content if the difference is determined to be less than or equal to the predetermined minimum value. In addition, the exemplary method includes correcting the anomaly such that the difference in the 3-D content is made to be less than the predetermined minimum value.

An exemplary embodiment of the present disclosure provides a non-transitory computer-readable recording medium having a computer program recorded thereon that causes a processor of computing device to enhance three-dimensional (3-D) content. The program causes the processor to execute operations comprising: determining an amount of a difference in 3-D content to be visualized by a left visual sensor and a right visual sensor; determining whether the amount of the difference is less than or equal to a predetermined minimum value; automatically outputting a notification of an anomaly in the 3-D content if the amount of the difference is determined to be less than or equal to the predetermined minimum value; and correcting the anomaly such that the difference in the 3-D content is made to be less than the predetermined minimum value.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION OF EXEMPLARY EMBODIMENTS

As noted above, at the present time, separate communication channels are used for 2-D and 3-D programs, necessitating the dedication of two (or more) separate communication "channels" to deliver the same media in both formats. Exemplary embodiments of the present disclosure solve this bandwidth consumption issue by transmitting a 2-D signal of content and a portion of a 3-D signal of that content, where the portion of the 3-D signal contains the difference between the 2-D and 3-D signals of the content, over the same communication channel. As discussed in further detail below, exemplary embodiments of the present disclosure discard the redundant portion of 2-D signals to be visualized by a first visual sensor (e.g., a first eye/camera) and a second visual sensor (e.g., a second eye/camera). The exemplary embodiments of the present disclosure substantially reduce the issue of excess bandwidth consumption associated with conventional techniques and thereby dynamically increase the amount of content that can be delivered within the same bandwidth allocation, while maintaining full compatibility with standard 2-D TV/HDTV signaling. The bandwidth saving techniques of the present disclosure also save bandwidth and improve the performance of 3-D-enabled fixed and mobile computing devices such as personal computers (PCs) and all manner of mobile internet devices (MIDs), e.g., netbooks, tablets, smartphones, and portable media players (PMPs).

As also noted above, some people complain of headaches, discomfort, fatigue, disorientation and other related maladies when watching stereoscopic 3-D movies or playing 3-D games for more than a few minutes. Exemplary embodiments of the present disclosure address these problems at two levels, (1) the manual, automated, and semi-automated editing level, and (2) at the transmission Head End.

Exemplary embodiments of the present disclosure provide a bandwidth efficient 3-D transmission and content delivery system for rendering and delivering 3-D content (e.g., stereographic/holographic 3-D entertainment and information) to viewers over multiple distribution systems, including, but not limited to: (1) radio frequency (RF) broadcast over-the-air; (2) cable and fiber optic distribution systems; (3) Internet delivery via TCP/IP and/or other Internet protocols; (4) satellite television delivery systems; (5) locally generated effects (i.e., 3-D effects generated and/or modified in the end user's display device); and (6) called-for exaggerated or custom 3-D effects.

Figure 1:
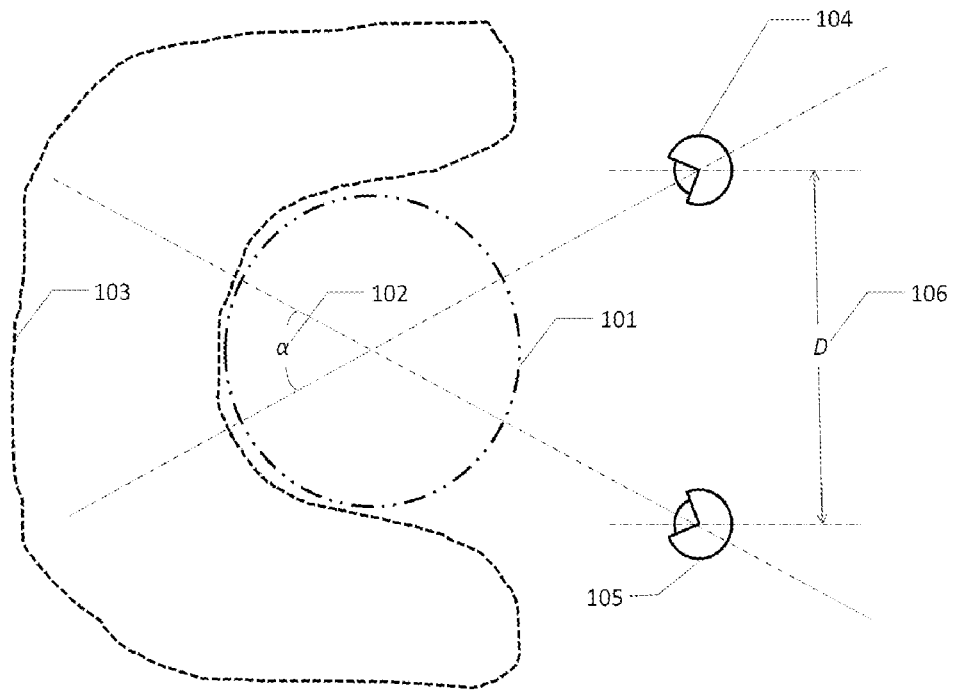
FIG. 1 is an explanatory diagram illustrating how humans perceive objects in three dimensions (3-D)

Referring to FIG. 1, due to interocular spacing D 106 (e.g., about 2.5 inches on average) of the eyes, stereoscopic 3-D is seen by humans for a distance of a few inches up to about 30 feet, which varies from person to person, in the central portion of a person's field of view 101 (without moving their head, but rather only their eyes 104 105), forming a convergence angle α 102 of about 28° on average, where the image from both eyes falls upon approximately the same region of each retina (respectively). Beyond that distance, a person's eyes can focus, but the brain is forced to use other clues, such as size, position and perspective to determine distance, as the view from each eye will essentially have the same perspective and a person only "sees" in 2-D in this region 103. When objects are closer to a person's face than the eyeballs can swivel to converge, double-vision takes place as the image from each eye's lenses will no longer fall on the same area of each eye's retina, respectively.

Figure 2:
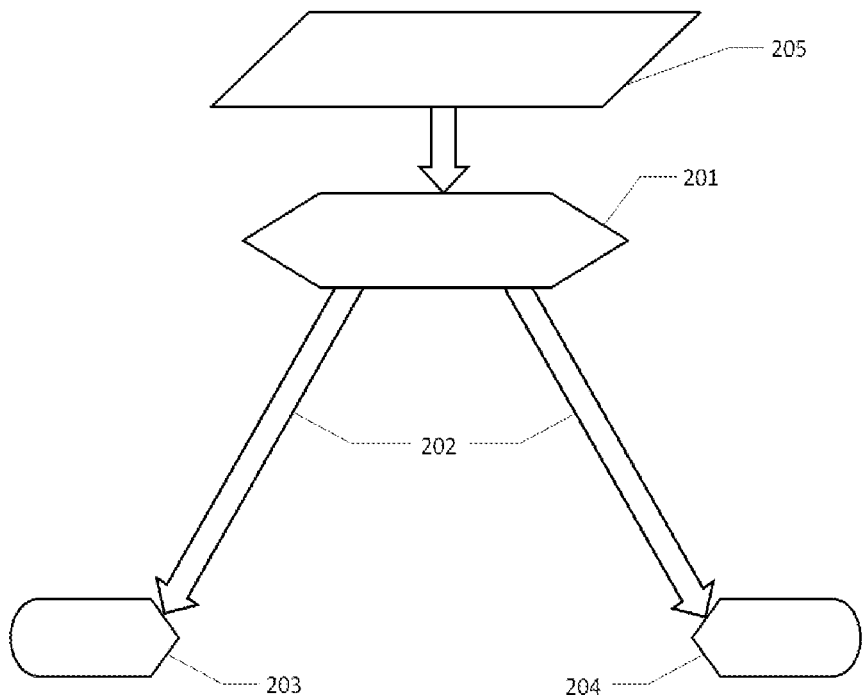
FIG. 2 is a block diagram of components according to an exemplary embodiment of the present disclosure.
Figure 3:
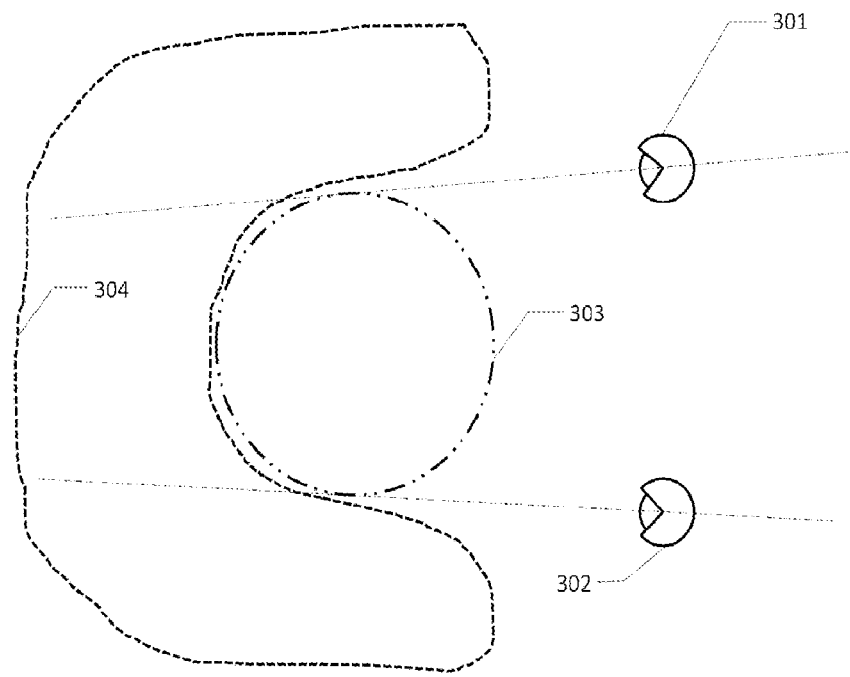
FIG. 3 is an explanatory diagram illustrating how one view (either left or right) can be redacted to save bandwidth, according to an exemplary embodiment of the present disclosure.

FIG. 2 is a block diagram of components according to an exemplary embodiment of the present disclosure, and FIG. 3 is an explanatory diagram illustrating how one view (either left or right) can be redacted to reduce bandwidth consumption, according to an exemplary embodiment of the present disclosure. With reference to FIGS. 2 and 3, a high-speed image processor(s) (e.g., processing unit) comprised in a processing unit (e.g., a Head End 201) determines the difference between what the left eye/camera 301 (e.g., left visual sensor) will see and what the right eye/camera 302 (e.g., right visual sensor) will see. When that difference reaches (e.g., less than or equal to) a predetermined minimum value (e.g., as the eyes gaze beyond the 3-D region of space 303 into the 2-D region of space 304 within the viewer's perceived line-of-sight), the portion of the images (corresponding to the amount of the difference) destined for one eye from one lens/camera (either 301 or 302) will be discarded, leaving a comparatively small difference to be transmitted/propagated/generated in order to produce simulated the 3-D effect in the viewer's brain. The Head End 201 is configured to transmit a signal 202 which includes a standard digital signal from one lens (for 2-D displays 203) plus the 3-D difference from the other lens (for 3-D displays 204) after the original signal 205 has been processed at the Head End 201. Original and/or locally-generated effects can originate in either (1) the Head End 201 and legacy signal sources (e.g., satellite, cable/fiber optics, terrestrial RF, Internet, etc.) 205 will not be required; or (2) within the computational capability of the television (TV), high-definition TV (HDTV), personal computer (PC), mobile Internet Device (MID), and/or portable media player (PMP) itself.

It is to be understood that a processor as described herein is specifically configured to perform the functions of the exemplary embodiments described herein. For example, the processor can be a general-purpose processor which executes a computer program recorded on a non-transitory computer-readable recording medium (e.g., ROM, hard disk drive, optical memory, flash memory, etc.). Alternatively, the processor can be an application specific processor configured to perform the functions of the exemplary embodiments described herein.

Figure 4:
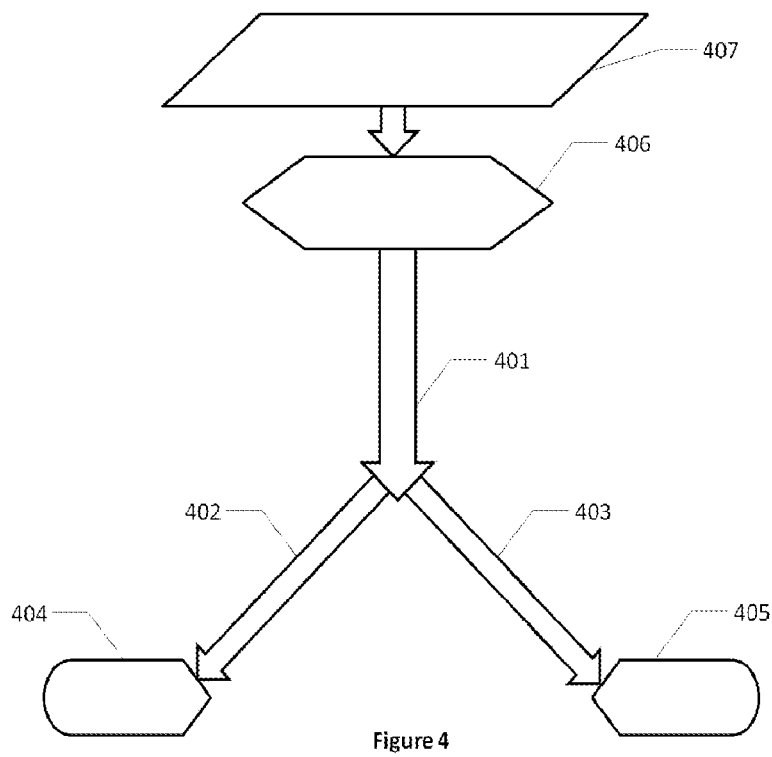
FIG. 4 is a block diagram of an exemplary embodiment of the present disclosure.

FIG. 4 is a block diagram of an exemplary embodiment of the present disclosure. As illustrated in FIG. 4, the combined 2-D and 3-D signals 401 include a 2-D signal 402 that: (1) can be received and displayed by standard 2-D devices 404 as 2-D images (the composite signal from one lens, not blurred, will be displayed); and (2) a 3-D signal 403 that can be received and displayed by standard 3-D enabled devices 405 as 3-D images (the composite signal from one lens plus the difference signal from the other lens will allow for the full 3-D effect to be viewed). The Head End 406 is configured to convert 2-D images from legacy sources 407 (e.g., satellite, cable/fiber optics, terrestrial RF, Internet, etc.) to 3-D images in real-time so they can be displayed as 3-D images on 3-D enabled devices.

Figure 5:
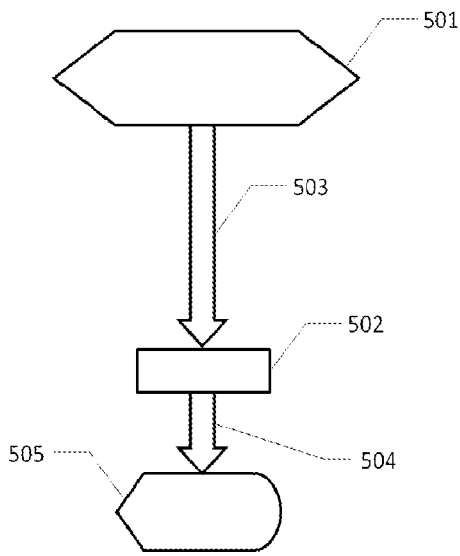
FIG. 5 is a block diagram of an exemplary embodiment of the present disclosure.

FIG. 5 illustrates an exemplary embodiment of the present disclosure in which the system originating at the processing unit (e.g, Head End 501) may or may not require a special set-top box 502 to interpret its signal 503 before it—in a further processed form 504—ultimately reaches a display 505.

Accordingly, exemplary embodiments of the present disclosure provide a device for delivering 3-D content. The exemplary device includes a receiving unit configured to receive a first signal containing at least 2-D content. The receiving unit can be included in the Head End 201, 406 in FIGS. 2 and 4, for example. Alternatively, the receiving unit can be an external component to the Head End. The receiving unit is configured to receive the first signal from a legacy signal source (e.g., 205, 407 in FIGS. 2 and 4) including at least one of satellite, RF cable, fiber optics, terrestrial RF and the Internet. The exemplary device also includes a processing unit configured to determine an amount of a difference in the content in the first signal to be visualized by a left visual sensor (e.g., eye/camera 104, 301 in FIGS. 1 and 3) and a right visual sensor (e.g., eye/camera 105, 302 in FIGS. 1 and 3), to determine whether the amount of the difference is less than or equal to a predetermined minimum value, and to discard a portion of the first signal to be visualized by one of the left visual sensor and the right visual sensor corresponding to the amount of the difference when the amount of the difference is determined to be less than or equal to the predetermined minimum value. According to an exemplary embodiment, the predetermined minimum value represents when one of the first visual sensor and the second visual sensor visualize the content in the first signal beyond a 3-D region of space into a 2-D region of space. In addition, the processing unit is configured to generate a second signal containing the 2-D content of the first signal and 3-D content in which the portion of the first signal to be visualized by the one of the left visual sensor and the right visual sensor is discarded. The exemplary device also includes a transmitting unit configured to transmit the second signal to at least one of a 2-D enabled device (e.g., 203, 404 in FIGS. 2 and 4) and a 3-D enabled device (e.g., 204, 405 in FIGS. 2 and 4).

Figure 8:
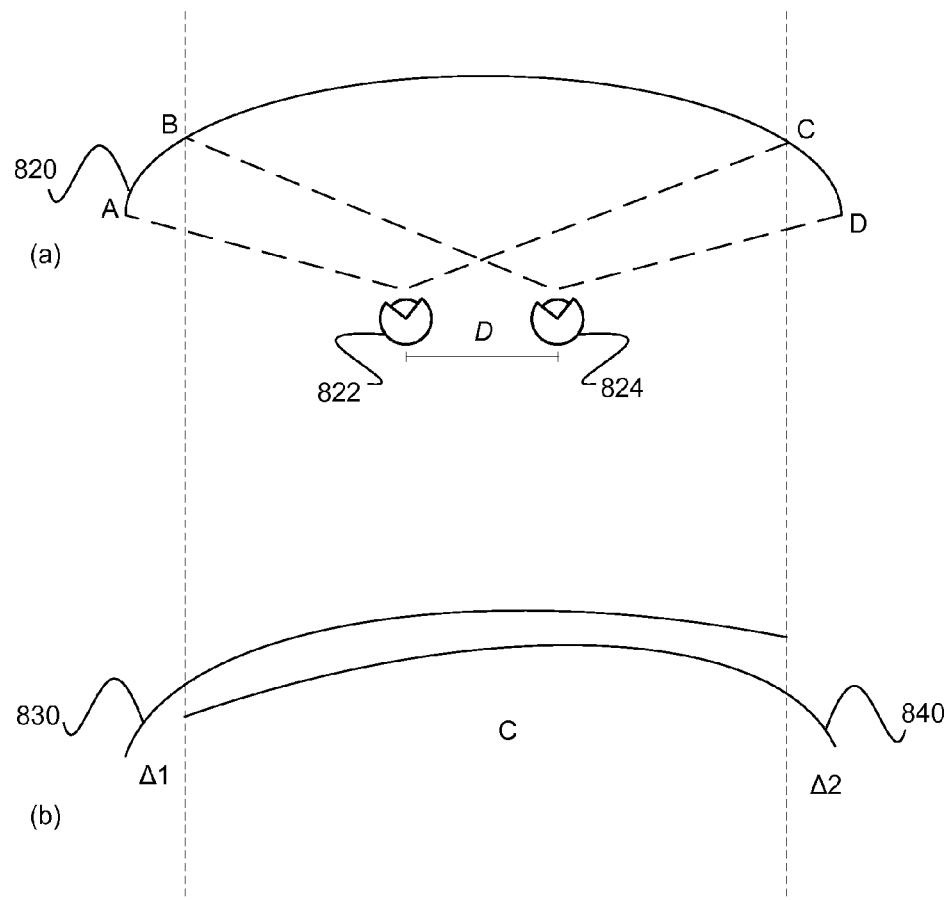
FIGS. 8(a) and (b) are explanatory diagrams illustrating exemplary features of the present disclosure in processing a signal received from a legacy source to reduce the redundant portion of the signal that is to be viewed by two visual sensors.

FIGS. 8(*a*) and (*b*) are explanatory diagrams illustrating exemplary features of the present disclosure in processing a signal received from a legacy source to discard a redundant portion of the signal that is to be viewed by both visual sensors. FIG. 8(*a*) illustrates an example of a first signal 820 received by the receiving unit of the exemplary device of the present disclosure from a legacy source. The first signal 820 can include two related 2-D signals collectively constituting 3-D content. For instance, a first visual sensor (e.g., camera lens 822) can capture a first 2-D signal containing content represented between points A to C of the signal 820 in FIG. 8(*a*), and a second visual sensor (e.g., camera lens 824) can capture a second 2-D signal containing content represented between points B to D of the signal 820 in FIG. 8(*a*). These first and second 2-D signals collectively constitute 3-D content represented between points A to D of the signal 820 in FIG. 8(*a*). FIG. 8(*a*) also illustrates how a first visual sensor 822 (e.g., left eye) would view a slightly different portion of the 3-D content than a second visual sensor 824 (e.g., right eye) based on the interocular spacing D. The dotted lines in FIG. 8(*a*) represent the different portions to be visualized by the first and second visual sensors 822, 824.

FIG. 8(*b*) is an exploded perspective view illustrating the different portions of the 3-D content to be viewed by the first and second visual sensors (e.g., left and right eyes) 822, 824. Reference symbol 830 in FIG. 8(*b*) designates a component of the 2-D signal 820 containing the portion of the 3-D content to be visualized by the first visual sensor 822 (e.g., left eye), and reference symbol 840 in FIG. 8(*b*) designates a component of the 2-D signal 820 containing the portion of the 3-D content to be visualized by the second visual sensor 824 (e.g., right eye). As illustrated in FIG. 8(*b*), the left and right eyes would both visualize a common portion C of the 3-D content. However, the left eye 822 would visualize a portion $\Delta 1$ of the 3-D content that is not visualized by the right eye 824 due to the interocular spacing D, and the right eye 824 would visualize a portion $\Delta 2$ of the 3-D content that is not visualized by the first visual sensor 822 due to the interocular spacing D. Accordingly, reference symbol C designates the common (redundant) portion of the 3-D signal to be viewed by both the first and second visual sensors (e.g., left and right eyes, respectively) 822, 824.

In accordance with an exemplary embodiment of the present disclosure, the processing unit of the device determines an amount of a difference in the content in the first signal 820 to be visualized by the first visual sensor 822 and the second visual sensor 824. The processing unit determines whether the amount of the difference is less than or equal to a predetermined minimum value (e.g., when one of the first visual sensor and the second visual sensor visualize the content in the first 2-D signal beyond a 3-D region into a 2-D region of the space). In the present example, the processing unit determines that the amount of the difference C to be viewed by one of the visual sensors (e.g., the right eye 824) is less than the predetermined minimum value, because both the first and second visual sensors 822, 824 will view the common portion C beyond a 3-D region into a 2-D region of space. Accordingly, the processing unit discards the portion C of the first 2-D signal 820 to be viewed by one of the visual sensors (e.g., the right eye 824) upon determining that the amount of the difference is less than or equal to the predetermined minimum value. In the present example, the processing unit discards the common portion C of component 840 of the 2-D signal 820, since that common portion C is contained in the component 830 of 2-D signal 820. The processing unit then generates a second signal containing (i) the 2-D content of component 830 of 2-D signal 820 (i.e., portion $\Delta 1$ plus common portion C of component 830) to be viewed by the first visual sensor 822 (e.g., left eye), and (ii) 3-D content containing portion $\Delta 2$ of component 840 to be visualized by the second visual sensor 840 (e.g., right eye). The common portion C of the first 2-D signal 820 to be visualized by the second visual sensor 824 is discarded and not included in the 3-D content of the second signal, since the common portion C of the first 2-D signal 820 is included in the 2-D component 830 of 2-D signal 820. Accordingly, in the present example, the second signal generated by the processing unit contains (i) component 830 of the 2-D signal 820 to be visualized by the left visual sensor ($\Delta 1$+C), and (ii) 3-D content ($\Delta 2$) in which the common (redundant) portion C of component 840 has been discarded. In the foregoing example, it was described that the common portion C contained in component 840 to be visualized by the second visual sensor (e.g., right eye) is discarded in creating the 3-D content of the second signal, since the common portion C is contained in component 830 included in the 2-D signal 820. The present disclosure is not limited to this example. For example, the second signal can be generated to include (i) component 840 of the 2-D signal 820 to be visualized by the right visual sensor ($\Delta 2+C$), and (ii) 3-D content ($\Delta 1$) in which the common portion C of component 830 is discarded.

In accordance with an exemplary embodiment, the predetermined minimum value can be a fixed value or it can be dynamically adjusted. For example, the predetermined minimum value can be adjusted for different scenes so that more or less of the common portion C of the first signal 820 to be viewed by the left and right visual sensors can be discarded when generating the second signal. The predetermined minimum value can also be adjusted for a difference in interocular spacing D and/or a difference in the spacing between camera lenses for capturing the content. The processing unit can automatically adjust the predetermined minimum value, for example, upon determining a scene change. The predetermined minimum value can also be adjusted upon receiving a control input, for example, from an operator of the exemplary device.

In accordance with an exemplary embodiment, the receiving unit, processing unit and transmitting unit can be provided in a single device, such as the Head End 201, 406 in FIGS. 2 and 4, for example. According to another exemplary embodiment, the receiving unit, processing unit and/or transmitting unit can be provided in different devices in the distribution stream between the legacy source and a multimedia device configured to display the second signal. For example, the receiving unit can be provided in a Head End while the processing unit is provided in a multimedia device (e.g., a television, set-top box, computer, mobile Internet device, portable media player, etc.) configured to display the second signal. Accordingly, the receiving, processing and transmitting functions can be located virtually anywhere in the distribution stream, such as before the cable, satellite, ISP Head End, at the Head End, or at the subscriber location in a set-top box connected to or integrally installed in a display device. Therefore, it is to be understood that the receiving, processing and transmitting functions of the exemplary embodiments disclosed herein can be performed in one or several devices in the distribution stream.

In the exemplary embodiments described above, the 2-D signal and the non-redundant portion of the 2-D signal which is not subtracted (discarded) were described as being transmitted on the same communication channel. According to an exemplary embodiment, the 2-D signal can be transmitted on a first communication channel, while the non-redundant portion of the 2-D signal which is not subtracted can be transmitted on a second communication channel distinct from the first communication channel.

In accordance with an exemplary embodiment, the device of the present disclosure can also include a recording unit configured to record the generated second signal containing the 2-D signal and the non-redundant portion of the 2-D signal which is not discarded onto a non-transitory recording medium, such as a DVD-ROM, BD-ROM, hard disk drive of a portable multimedia player, etc., for distribution of the second signal. In addition to recording the second signal containing the 2-D signal and the non-redundant portion of the 2-D signal which is not discarded, the second signal can also be transmitted via wired and/or wireless electronic distribution mediums through public networks such as the Internet, as well as private networks such as Intranets, for example. Due to the reduced data size of the second signal, as compared to the recording and transportation of conventional 3-D signals, the present disclosure enables a reduced downloading and/or transmitting time, as well as a reduction in computer storage requirements. Accordingly, the present disclosure enables devices to be able to store, download and/or transmit more information as compared to conventional 3-D techniques. Use of this reduced bandwidth technique according to the exemplary embodiments of the present disclosure can extend to, for example, all forms of professional and consumer digital stereo 3D production, storage, transmission and display equipment, including computers, 3D cameras, editing, and/or projection and delivery systems. In accordance with an exemplary embodiment of the present disclosure, the redundant portion of a 2-D signal from one or more visual sensors is discarded, while the non-redundant portion is saved. The non-redundant portion amounts to a difference between two or more 2-D signals. Accordingly, it is to be understood that the exemplary embodiments of the present disclosure provide for a technique of lossless redundant data removal for delivering 3-D content, where the difference between two or more 2-D signals is saved, while redundant portions of these 2-D signals are discarded in accordance with the above-described exemplary embodiments.

In accordance with an exemplary embodiment, the device of the present disclosure can also transmit information identifying the redundant portion of the 2-D signal which is discarded from the 3-D portion of the second signal, so that a 3-D enabled device receiving the second signal can reconstruct the 3-D content for display of the portion of the 3-D content which was discarded. For instance, with reference to the above-described example in FIGS. 8(*a*) and (*b*), the common portion C of component 840 of 2-D signal 820 was discarded in creating the 3-D content of the second signal, since the common portion C of component 840 is also contained in component 830 of the 2-D signal which is included in the second signal. In generating the second signal, the processing unit can also transmit information and/or include information with the second signal which identifies the common portion C of the second signal so that a 3-D enabled device can accurately reconstruct the 3-D content and display the common component for the visual sensor (e.g., right eye) for which the common component was discarded in generating the second signal.

In accordance with an exemplary embodiment, the device of the present disclosure can also include a compression unit configured to compress the generated second signal containing the 2-D signal and the non-redundant portion of the 2-D signal which is not discarded. In accordance with an exemplary embodiment, the compression unit can be comprised in the processing unit, or it can be a separate component of the processing device. The compression unit can compress the generated second signal according to any predetermined compression technique, such as MPEG-4, H.264, VC-2, for example. The compression of the second signal can further reduce the amount of data to be transmitted and/or recorded by the above-described transmitting unit and recording unit, respectively. In addition, an exemplary embodiment of the present disclosure also provides that the compression unit can compress the individual 2-D signals prior to the generation of the second signal. For instance, an exemplary embodiment of the present disclosure provides that the compression unit can compress the 2-D signals received from multiple cameras, and then the redundant portion of one or more of the 2-D signals is discarded in accordance with the above-described exemplary embodiments.

Figure 9:
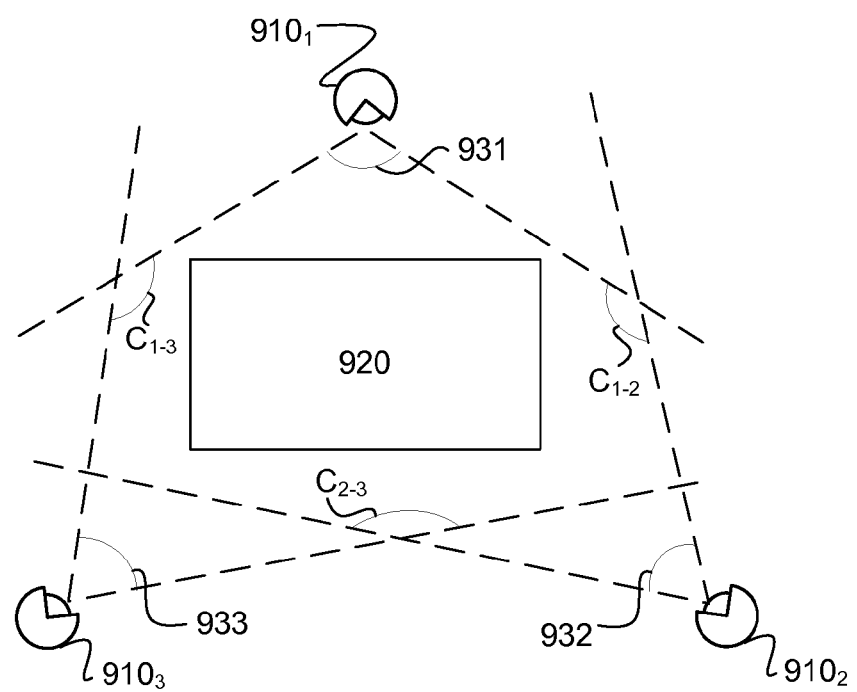
FIG. 9 is a block diagram of an exemplary embodiment in which three cameras are positioned approximately at 120 degree spacing around an object.

The exemplary embodiments described with reference to FIGS. 8(*a*) and (*b*) utilize two cameras. Exemplary embodiments of the present disclosure also provide for multi-camera applications that have more than two 2-D views. FIG. 9 illustrates an example in which three cameras $910_1$, $910_2$, $910_3$ are positioned approximately at 120 degree spacing around an object 920. Consistent with the techniques of the above-described exemplary embodiments, the bandwidth-reducing techniques of the present disclosure can be implemented in this multi-camera application by receiving individual 2-D signals from the three cameras $910_1$, $910_2$, $910_3$, respectively, and discarding any redundant portion of the 2-D signals which overlap the corresponding 2-D signal obtained by a neighboring camera. For example, as illustrated in FIG. 9, there exists a common portion $C_{1-2}$ between the 2-D signal 931 obtained by camera $910_1$ and the 2-D signal 932 obtained by camera $910_2$. In addition, there exists a common portion $C_{2-3}$ between the 2-D signal 932 obtained by camera $910_2$ and the 2-D signal 933 obtained by camera $910_3$. Furthermore, there exists a common portion $C_{1-3}$ between the 2-D signal 931 obtained by camera $910_1$ and the 2-D signal 933 obtained by camera $910_3$. In accordance with the exemplary embodiments of the present disclosure, the common portions of one of the pairs of the above-described signals containing a common portion can be discarded in generating the second signal. For example, in generating the second signal containing a 3-D signal, the common portion $C_{1-2}$ can be discarded from the 2-D signal 932 obtained by camera $910_2$, the common portion $C_{2-3}$ can be discarded from the 2-D signal 933 obtained by camera $910_3$, and the common portion $C_{1-3}$ can be discarded from the 2-D signal 931 obtained by camera $910_1$. In this example, the second signal containing 3-D content of the 2-D signals 931, 932 and 933 includes: (i) 2-D signal 931 in which the common portion $C_{1-3}$ was discarded, (ii) 2-D signal 932 in which the common portion $C_{1-2}$ was discarded, and (iii) 2-D signal 933 in which the common portion $C_{2-3}$ was discarded. The 3-D signal thus obtained contains multiple 2-D signals, but common portions between the 2-D signals may be discarded in accordance with the exemplary embodiments of the present disclosure. The present disclosure is not restricted to the above example. For instance, the common portion $C_{1-2}$ can alternatively be discarded from the 2-D signal 931 obtained by camera $910_1$, the common portion $C_{2-3}$ can be discarded from the 2-D signal 932 obtained by camera $910_2$, and the common portion $C_{1-3}$ can be discarded from the 2-D signal 933 obtained by camera $910_3$. In accordance with this exemplary embodiment, a viewer could rotate the 3-D image to view three or more sides of the object 920. For example, the viewer could rotate the image using the generated second signal since it is a 3-D signal constituting a compilation of the signals 931-933. Depending on the camera positions, the 3-D image constituting a compilation of signals 931-933 could enable the viewer to rotate the image as a look-around image and thereby see multiple, if not all, of the sides of the object(s) captured by the multiple cameras. FIG. 9 illustrates an example in which the cameras $910_1$, $910_2$, $910_3$ are in a relative lateral plane. However, the present disclosure is not limited to this example. The multi-camera application of the present disclosure can include cameras at any desired placement. For example, a camera can be placed above an object (e.g., a satellite camera), and multiple cameras can be placed on the ground at various heights and distances relative to the object to be viewed. Such a multi-camera application can be utilized in a myriad of situations, such as large area surveillance and ranging, for example.

An exemplary embodiment of the present disclosure also provides a method for delivering three-dimensional (3-D) content. The exemplary method includes receiving a first signal containing at least two-dimensional (2-D) content, and determining, in a processing unit of a computerized device (e.g., the above-described processing unit), an amount of a difference in the content in the first signal to be visualized by a left visual sensor and a right visual sensor. The exemplary method also includes determining, in the processing unit, whether the amount of the difference is less than or equal to a predetermined minimum value. According to an exemplary embodiment, the predetermined minimum value represents when one of the first visual sensor and the second visual sensor visualize the content in the first signal beyond a 3-D region of space into a 2-D region of space. In addition, the exemplary method includes discarding, in the processing unit, the first signal to be visualized by one of the left visual sensor and the right visual sensor if the amount of the difference is determined to be less than or equal to the predetermined minimum value. Furthermore, the exemplary method includes generating, in the processing unit, a second signal containing the 2-D content of the first signal and 3-D content in which the first signal to be visualized by the one of the left visual sensor and the right visual sensor is discarded.

Figure 6:
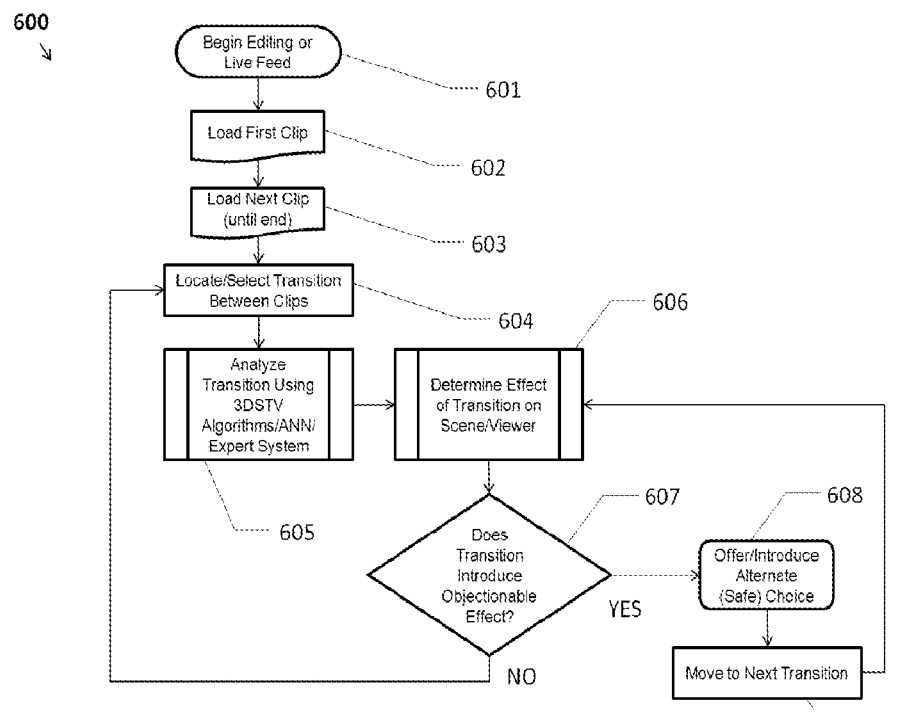
FIG. 6 is a flowchart of an exemplary method and/or software algorithm executed by a processor according to an exemplary embodiment of the present disclosure.
Figure 7:
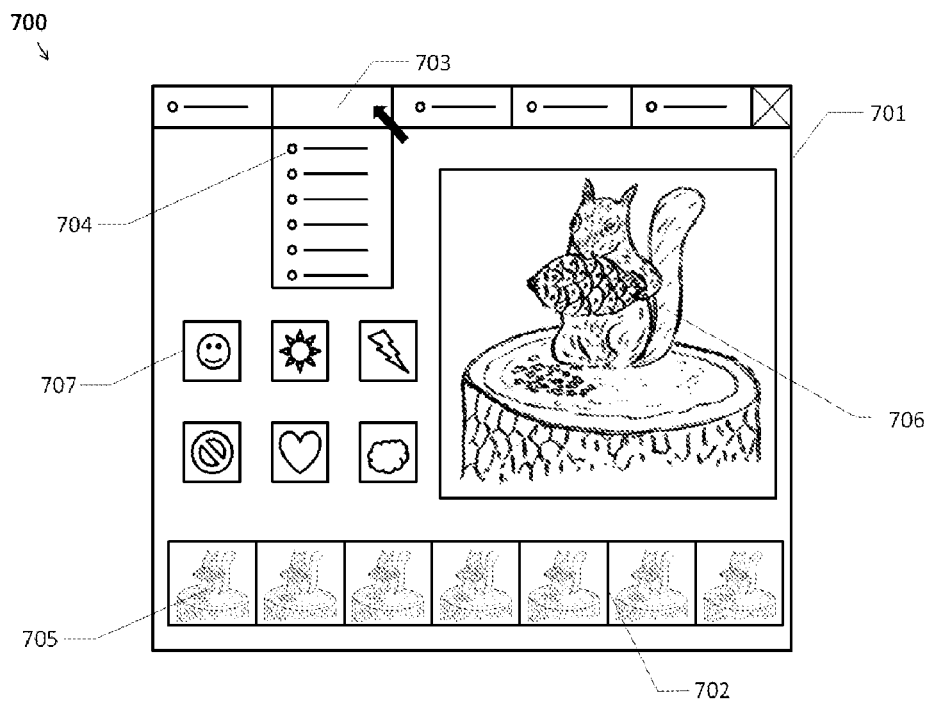
FIG. 7 is a pictorial diagram conveying exemplary features of the SEES graphical user interface (GUI)

Referring to FIGS. 6 and 7, the headache, discomfort and/or disorientation problems with conventional 3-D systems will be addressed by the introduction of a Stereo Editing Expert System (SEES) 600, which will be achieved by artificial neural network (ANN) 605 processing and/or other artificial intelligence (AI) techniques. Also, in computational-capable HDTV sets (or PCs, MIDs, PMPs, etc.), a viewer-related control can be provided to facilitate the desired or perceived degree of 3-D (and the resulting comfort level of the viewer) by simulating different interocular spacings (i.e., distances between the viewer's eyes). For example, the above-described processing unit for discarding the redundant portion of the 2-D signal to be seen by left and right visual sensors can be provided in such HDTV sets, PCs, MIDs, PMPs, etc. to process the received 2-D signal and generate the second signal containing the 2-D signal to be visualized by one of the visual sensors and 3-D content in which the common portion of the 2-D signal is discarded for the other one of the visual sensors.

The autonomous or semi-autonomous SEES 600 application program and graphical user interface 701 will detect anomalies 606, 607 and alter the content 706 during the electronic "editing" phase 601 or in the case of live events, during the transmission phase 601. SEES functions as an "Editor's Best Practices Assistant" 700 that advises the human video editor on how to successfully avoid offensive 3-D effects by the dynamic and/or interactive application of techniques 608 such as deemphasizing 3-D during certain transitions, for example. Detection of problems and determination of how to properly format the 3-D content 705 being edited will be achieved by scanning 602, 603, 604, and 609 and analyzing 605, 606, and 607 online or offline in real-time, near real-time, or in batch mode (at scene transitions 702 or other strategic locations) and/or by providing guidance when actively sought by the human editor (e.g., by making a selection 704 from drop/pull-down menu(s) 703 or by selecting a transition/effect icon 707). The above-described processing unit can execute the functions of the SEES 600 application program and cause the graphical user interface 701 to be displayed on an appropriate display device. As such, the processing unit, when scanning and analyzing the received 2-D signal can, by executing the SEES 600 application program, output a notification of anomaly (e.g., a discrepancy in 3-D content to be displayed) via the graphical user interface 701 for correction of the anomaly. For example, when determining that an amount of a difference in 3-D content to be visualized by a left visual sensor and a right visual sensor is less than or equal to a predetermined minimum value (e.g., when one of the left visual sensor and the right visual sensor visualize the 3-D content beyond a 3-D region of space into a 2-D region of space), the processing unit can output notification of an anomaly via the graphical user interface 701 for correction of the anomaly, upon receiving a corrective instruction from an operator. In accordance with an exemplary embodiment, the processing unit can also automatically correct the anomaly, for example, by removing 3-D content to be displayed for a predetermined period of time (e.g., a fraction of a second up to several seconds). As noted above, the predetermined minimum value is adjustable. For example, the processing unit can receive an instruction to adjust the predetermined minimum value from an operator via the graphical user interface 701.

Accordingly, an exemplary embodiment of the present disclosure provides a method for enhancing 3-D content. The exemplary method includes determining, in a processing unit of a computerized device (e.g., a processor executing the SEES 600 application program), an amount of a difference in 3-D content to be visualized by a left visual sensor and a right visual sensor. The exemplary method includes determining, in the processing unit, whether the difference is less than or equal to a predetermined minimum value. According to an exemplary embodiment, the predetermined minimum value represents when one of the right visual sensor and the left visual sensor visualize the content in the first signal beyond a 3-D region of space into a 2-D region of space. The exemplary method also includes automatically outputting a notification of an anomaly in the 3-D content if the difference is determined to be less than or equal to the predetermined minimum value. In addition, the exemplary method includes correcting the anomaly such that the difference in the 3-D content is made to be less than the predetermined minimum value.

Exemplary embodiments of the present disclosure also provide a non-transitory computer-readable recording medium having a computer program recorded thereon that causes a processor of a computing device carry out any of the above-described exemplary methods of the present disclosure.

While it is an objective of the exemplary device and method of the present disclosure to be 100% compatible with existing television, computer, mobile and other display systems, special Head End transmission equipment may be required.

Perhaps viewer satisfaction will be optimized when special cameras are used to record 3-D programs. For example, communicating lenses may be used to more accurately mimic how human eyes capture 3-D scenes.

There appear to be some similarities between the Stereo 3-D bandwidth problem and the transmission of high-definition television (HDTV), we therefore assert that some or all of the solutions of the exemplary embodiments of the present disclosure will apply to HDTV.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A device for delivering three-dimensional (3-D) content, the device comprising:

a receiving unit configured to receive a first signal containing at least two-dimensional (2-D) content; and
a processing unit configured to:
 determine an amount of a difference in the content in the first signal to be visualized by a left visual sensor and a right visual sensor,
 determine whether the amount of the difference is less than or equal to a predetermined minimum value, and to discard a portion of the first signal to be visualized by one of the left visual sensor and the right visual sensor corresponding to the amount of the difference when the amount of the difference is determined to be less than or equal to the predetermined minimum value; the predetermined minimum value representing when one of the first visual sensor and the second visual sensor visualize the content in the first signal beyond a 3-D region of space into a 2-D region of space; and
 generate a second signal containing the 2-D content of the first signal and 3-D content in which the portion of the first signal to be visualized by the one of the left visual sensor and the right visual sensor is discarded.

2. The device according to claim 1, comprising:
a transmitting unit configured to transmit the second signal to at least one of a 2-D enabled device and a 3-D enabled device.

3. The device according to claim 1, wherein the receiving unit is configured to receive the first signal from a legacy signal source including at least one of satellite, RF cable, fiber optics, terrestrial RF and the Internet.

4. The device according to claim 1, wherein the receiving unit is comprised in a head end.

5. The device according to claim 4, wherein the processing unit is comprised in a head end.

6. The device according to claim 4, wherein the processing unit is comprised in a multimedia device configured to display the second signal.

7. The device according to claim 6, wherein the multimedia device configured to display the second signal is at least one of a television, a computer, a mobile Internet device, and a portable media player.

8. The device according to claim 1, wherein the processing unit is configured to convert the content in the first signal into 3-D content contained in the second signal.

9. The device according to claim 2, wherein the transmitting unit is configured to transmit the 2-D content of the first signal contained in the second signal to a 2-D enabled device, and to transmit the 3-D content in the second signal to a 3-D enabled device.

10. The device according to claim 2, wherein the transmitting unit is configured to transmit the 2-D content of the first signal and transmit the 3-D content in the second signal on the same communication channel.

11. The device according to claim 2, wherein the transmitting unit is configured to transmit the 2-D content of the first signal on a first communication channel and transmit the 3-D content in the second signal on a second communication channel distinct from the first communication channel.

12. The device according to claim 2, comprising:
a compression unit configured to compress the second signal according to a predetermined compression technique,
wherein the transmitting unit is configured to transmit the compressed second signal.

13. The device according to claim 1, wherein the first signal received by the receiving unit includes two related 2-D signals collectively constituting 3-D content.

14. The device according to claim 1, comprising:
a recording unit configured to record the second signal onto a non-transitory recording medium.

15. The device according to claim 14, comprising:
a compression unit configured to compress the second signal according to a predetermined compression technique,
wherein the recording unit is configured to record the compressed second signal onto the non-transitory recording medium.

16. The device according to claim 1, wherein the processing unit is configured to generate information identifying the common portion included in the second signal for reconstruction of the second signal in a 3-D enabled device.

17. The device according to claim 1, wherein the processing unit is configured to enhance the 3-D content included in the second signal by:
determining an amount of a difference in the 3-D content to be visualized by the left visual sensor and the right visual sensor;
determining whether the difference is less than or equal to the predetermined minimum value;
automatically outputting a notification of an anomaly in the 3-D content when the amount of the difference is determined to be less than or equal to the predetermined minimum value; and
correcting the anomaly such that the difference in the 3-D content is made to be less than the predetermined minimum value.

18. The device according to claim 1, wherein the predetermined minimum value is adjustable.

19. The device according to claim 1, comprising:
a transmitting unit configured to transmit the second signal to a receiving device via at least one of a wired and wireless transmission medium.

20. The device according to claim 19, comprising:
a compression unit configured to compress the second signal according to a predetermined compression technique,
wherein the transmitting unit is configured to transmit the compressed second signal.

21. A device for delivering three-dimensional (3-D) content, the device comprising:
a receiving unit configured to receive a first signal containing at least two-dimensional (2-D) content; and
a processing unit configured to:
determine an amount of a difference in the content in the first signal to be visualized by a left visual sensor and a right visual sensor;
determine whether the amount of the difference is less than or equal to a predetermined minimum value, and to discard a portion of the first signal to be visualized by one of the left visual sensor and the right visual sensor corresponding to the amount of the difference when the amount of the difference is determined to be less than or equal to the predetermined minimum value; and
generate a second signal containing the 2-D content of the first signal and 3-D content in which the portion of the first signal to be visualized by the one of the left visual sensor and the right visual sensor is discarded;
wherein the left visual sensor is a first visual sensor, the right visual sensor is a second visual sensor, and the first signal received by the receiving unit contains 2-D content to be visualized by the first visual sensor, the second visual sensor, and a third visual sensor, and
wherein the processor is configured to:
determine an amount of a first difference in the content in the first signal to be visualized by the first visual sensor and the second visual sensor;
determine an amount of a second difference in the content in the first signal to be visualized by the second visual sensor and the third visual sensor;
determine an amount of a third difference in the content in the first signal to be visualized by the first visual sensor and the third visual sensor;
determine whether the amount of the first difference is less than or equal to the predetermined minimum value, and discard a portion of the first signal to be visualized by one of the first visual sensor and the second visual sensor corresponding to the amount of the first difference when the amount of the first difference is determined to be less than or equal to the predetermined minimum value;
determine whether the amount of the second difference is less than or equal to the predetermined minimum value, and discard a portion of the first signal to be visualized by one of the second visual sensor and the third visual sensor corresponding to the amount of the second difference when the amount of the second difference is determined to be less than or equal to the predetermined minimum value;
determine whether the amount of the third difference is less than or equal to the predetermined minimum value, and discard a portion of the first signal to be visualized by one of the first visual sensor and the third visual sensor corresponding to the amount of the third difference when the amount of the third difference is determined to be less than or equal to the predetermined minimum value; and
generate the second signal to contain the 2-D content of the first signal and 3-D content in which the portion of the first signal to be visualized by the one of the first visual sensor and the second visual sensor is discarded, the portion of the first signal to be visualized by the one of the second visual sensor and the third visual sensor is discarded, and the portion of the first signal to be visualized by the one of the first visual sensor and the third visual sensor is discarded.

22. A method for delivering three-dimensional (3-D) content, the method comprising:
receiving a first signal containing at least two-dimensional (2-D) content;
determining, in a processing unit of a computerized device, an amount of a difference in the content in the first signal to be visualized by a left visual sensor and a right visual sensor;
determining, in the processing unit, whether the amount of the difference is less than or equal to a predetermined minimum value; the predetermined minimum value representing when one of the first visual sensor and the second visual sensor visualize the content in the first signal beyond a 3-D region of space into a 2-D region of space;
discarding, in the processing unit, a portion of the first signal to be visualized by one of the left visual sensor and the right visual sensor corresponding to the amount of the difference when the amount of the difference is determined to be less than or equal to the predetermined minimum value; and
generating, in the processing unit, a second signal containing the 2-D content of the first signal and 3-D content in which the portion of the first signal to be visualized by the one of the left visual sensor and the right visual sensor is discarded.

23. The method according to claim 22, comprising:
transmitting the second signal to at least one of a 2-D enabled device and a 3-D enabled device.

24. The method according to claim 23, wherein the transmitting of the second signal comprises:
transmitting the 2-D content of the first signal contained in the second signal to the 2-D enabled device, and transmitting the 3-D content in the second signal to the 3-D enabled device.

25. The method according to claim 22, wherein the predetermined minimum value represents when one of the first visual sensor and the second visual sensor visualize the content in the first signal beyond a 3-D region of space into a 2-D region of space.

26. The method according to claim 22, comprising:
recording the second signal onto a non-transitory recording medium.

27. The method according to claim 22, comprising enhancing the 3-D content included in the second signal, the enhancing of the 3-D content comprising:
determining an amount of a difference in the 3-D content to be visualized by the left visual sensor and the right visual sensor;
determining whether the difference is less than or equal to the predetermined minimum value;
automatically outputting a notification of an anomaly in the 3-D content when the amount of the difference is determined to be less than or equal to the predetermined minimum value; and
correcting the anomaly such that the difference in the 3-D content is made to be less than the predetermined minimum value.

28. The method according to claim 22, wherein the predetermined minimum value is adjustable.

29. A non-transitory computer-readable recording medium having a computer program recorded thereon that causes a processor of computing device to deliver three-dimensional (3-D) content, the program causing the processor to execute operations comprising:
receiving a first signal containing at least two-dimensional (2-D) content;
determining an amount of a difference in the content in the first signal to be visualized by a left visual sensor and a right visual sensor;
determining whether the amount of the difference is less than or equal to a predetermined minimum value, the predetermined minimum value representing when one of the first visual sensor and the second visual sensor visualize the content in the first signal beyond a 3-D region of space into a 2-D region of space;
discarding a portion of the first signal to be visualized by one of the left visual sensor and the right visual sensor corresponding to the amount of the difference when the amount of the difference is determined to be less than or equal to the predetermined minimum value; and
generating a second signal containing the 2-D content of the first signal and 3-D content in which the portion of the first signal to be visualized by the one of the left visual sensor and the right visual sensor is discarded.

30. The computer-readable recording medium according to claim 29, wherein the predetermined minimum value represents when one of the first visual sensor and the second visual sensor visualize the content in the first signal beyond a 3-D region of space into a 2-D region of space.

31. The computer-readable recording medium according to claim 29, wherein the predetermined minimum value is adjustable.

32. A method for enhancing three-dimensional (3-D) content, the method comprising:
determining, in a processing unit of a computerized device, an amount of a difference in 3-D content to be visualized by a left visual sensor and a right visual sensor;
determining, in the processing unit, whether the difference is less than or equal to a predetermined minimum value, the predetermined minimum value representing when one of the first visual sensor and the second visual sensor visualize the content in the first signal beyond a 3-D region of space into a 2-D region of space;
automatically outputting a notification of an anomaly in the 3-D content when the amount of the difference is determined to be less than or equal to the predetermined minimum value; and
correcting the anomaly such that the difference in the 3-D content is made to be less than the predetermined minimum value.

33. The method according to claim 32, wherein the predetermined minimum value represents when one of a first visual sensor and a second visual sensor visualize the 3-D content beyond a 3-D region of space into a 2-D region of space.

34. The method according to claim 32, wherein the correcting of the anomaly comprises automatically correcting the anomaly.

35. The method according to claim 32, wherein the correcting of the anomaly comprises correcting the anomaly upon receiving a corrective instruction from an operator.

36. The method according to claim 32, wherein the predetermined minimum value is adjustable.

37. A non-transitory computer-readable recording medium having a computer program recorded thereon that causes a processor of computing device to enhance three-dimensional (3-D) content, the program causing the processor to execute operations comprising:
determining an amount of a difference in 3-D content to be visualized by a left visual sensor and a right visual sensor;
determining whether the amount of the difference is less than or equal to a predetermined minimum value, the predetermined minimum value representing when one of the first visual sensor and the second visual sensor visualize the content in the first signal beyond a 3-D region of space into a 2-D region of space;
automatically outputting a notification of an anomaly in the 3-D content when the amount of the difference is determined to be less than or equal to the predetermined minimum value; and
correcting the anomaly such that the difference in the 3-D content is made to be less than the predetermined minimum value.

38. The computer-readable recording medium according to claim 37, wherein the predetermined minimum value represents when one of a first visual sensor and a second visual sensor visualize the 3-D content beyond a 3-D region of space into a 2-D region of space.

39. The computer-readable recording medium according to claim 37, wherein the predetermined minimum value is adjustable.

* * * * *